UNITED STATES PATENT OFFICE 2,093,695

PROCESS FOR THE PREPARATION OF CARBOXYLIC ACID ESTERS

Alfred T. Larson, Wilmington, Del., assignor to E. I. du Pont de Nemours & Company, Wilmington, Del., a corporation of Delaware No Drawing. Application May 13, 1933, Serial No. 670,997

9 Claims. (Cl. 260—106)

This invention relates to the synthesis of organic compounds and more particularly to the preparation of aliphatic esters of high molecular weight by the interaction of the aliphatic acids or esters of low molecular weight with olefinic hydrocarbons.

A previous patent, U. S. 1,365,052, filed June 30, 1916, in the names of Carleton Ellis and Mortimer J. Cohen, and U. S. 1,877,291 in the names of Per K. Frolich and Philip L. Young, filed Jan. 21, 1930, describe various methods of recovering olefines from gaseous and liquid mixtures and directly esterifying them by contact with fatty or similar organic acids together in the presence of sulfuric acid as the catalyst. The present method comprises an improvement in processes of this general nature by which the reaction can be more readily and economically carried out.

It is an object of the present invention to provide an improved process for the preparation of aliphatic organic esters of higher molecular weight from acids or esters of low molecular weight by condensing the latter with olefinic hydrocarbons. Another object of the present invention is to provide an improved process for the interaction of olefines and organic acids to give aliphatic organic esters. A still further object of the invention is to provide a vapor phase process for the interaction of olefines with aliphatic organic esters to give esters, the carbon content of which is increased by the number of carbon atoms in the olefines. A still further object of the invention is to provide optimum conditions and highly efficient catalysts for carrying out said organic syntheses. Other objects and advantages will hereinafter appear.

I have found that organic esters and compounds of the higher order can be produced by the reaction of acyloxy compounds, such as, for example, acids, esters, and halides, and an olefinic hydrocarbon, i. e. an aliphatic hydrocarbon containing a double bond,—for example, the olefines: ethylene, propylene, butylene; as well as the diolefines, such as butadiene, isoprene, etc. The hydrocarbons may be represented generically by the formula: $RR_1C:CR_2R_3$, in which R, $R_1$, $R_2$ and $R_3$ represent hydrogen or an alkyl radical. The compounds which may be reacted, in accord with my invention, with these olefinic hydrocarbons may be designated by the structural formula: $R_yCOOX$, in which $R_y$ designates an alkyl, aryl, or aralkyl group and in which X is any univalent element or group. It will be appreciated that many compounds are represented by the formula RCOOX; it is to be understood, however, that I include thereby only those compounds which are relatively stable in the vapor phase. The ester-forming reaction of the hydrocarbons with compounds of this nature apparently proceeds in accord with the equation:

Thus, propylene, for example, reacts with acetic acid to give propyl acetate:

and ethylene reacts with ethyl acetate to give butyl acetate:

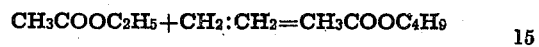

Propylene, butylene, and the higher mono- and diolefines similarly yield higher esters.

In accord with my invention, any compound, conforming with the structural formula RCOOX, may be reacted with an olefinic hydrocarbon to obtain compounds which are usually esters of higher molecular weight. The sole requirement is that the componds conforming with this structural formula should not appreciably decompose in the vapor phase. Accordingly, in the substitutions made in the R and X positions, these substitutions should not render the resulting compound of such a nature that under the temperature of the reaction it appreciably decomposes. It will be appreciated, therefore, by those skilled in this art that for R many alkyl, aryl, and aralkyl groupings and that for X any univalent element or group may be substituted. Examples of these compounds include the aliphatic carboxylic acids, such, for example, as formic, acetic, propionic, etc.; the esters of these acids, for example methyl formate, ethyl formate, methyl acetate, ethyl acetate, propyl propionate, and the higher alkyl esters of these acids. Substituents other than hydrogen or organic groups may replace the X giving, with halogen substitutions, such compounds as methyl chloroformate in which the X has been substituted by a chlorine atom. The aromatic acids, esters, or other compounds having proper stability under the conditions of the reaction, such, for example, as benzoic acid, methyl benzoate and similar compounds, may be employed. A number of equivalents have been cited to indicate that the reaction is dependent on the presence of the COO-group rather than on the particular substituents in the R and X positions.

Raw materials suitable for use in the process are readily available from a number of sources. Thus, ethylene and the various homologues thereof are found in the gases evolved in cracking petroleum and may be separated therefrom, for example, by fractional liquefaction. It is preferable, for the sake of avoiding undesirable by-products, that the hydrocarbons which it is desired to use be employed in a relatively high degree of purity.

Inert gases, such as nitrogen, methane, and carbon dioxide, may be included with the reactants, this being advantageous in some cases from the standpoint of controlling the temperature of the exothermic reaction and of limiting the extent thereof, for it may be desired to restrict the degree of conversion for the sake of enhancing the relative yield of the desired ester. When employing one or more of the above gases as inert carriers to effect these advantages, it or they shall generally be present in amounts constituting approximately 40% or more by volume of the whole gaseous mixture.

The relative proportions of reactants can be varied, altho it has been found that in order to avoid side reactions involving the polymerization of the olefines, it is of advantage to work with the compounds containing the acyloxy group in excess with respect to the olefinic hydrocarbons. Concentrations of the latter within the range of from 5 to 30% by volume of the total reactants are satisfactory. Higher concentrations may be used, but usually under such conditions correspondingly lower pressures should be employed in order to inhibit all possible condensation.

The use of pressures in excess of atmospheric, say from 25–900 atmospheres, is preferred. The reaction proceeds over a wide range of temperatures while working under these pressures, altho the optimum temperature varies with specific cases, depending inter alia upon the hydrocarbon being used. Generally the desired reaction can be obtained at from 200–500° C. From the practical standpoint the temperature should not be so low that the reaction rate is uneconomical nor so high as to result in undesirable by-products by decomposition and/or polymerization of the raw materials. From this point of view the process is operated satisfactorily at from 275–375° C.

The following examples will illustrate methods of practicing the invention, although the invention is not limited thereto:

*Example 1.*—A gaseous mixture consisting of approximately 75% acetic acid, 24% propylene, and 1% hydrogen chloride is passed at a pressure of 700 atmospheres and a temperature of 375° C., over an active carbon catalyst. A concentrate, containing propyl acetate, is obtained upon cooling the converted gases.

*Example 2.*—A gaseous mixture containing by volume approximately 75% ethyl acetate, 24% ethylene, and 1% hydrogen chloride is passed at a temperature of 325° C. and a pressure of 700 atmospheres, over an activated charcoal catalyst. The condensate containing butyl acetate is obtained upon cooling.

Other catalysts which may be employed in the process include generally the inorganic acids, e. g. acids of phosphorus, arsenic, and boron, which catalysts may be present in the activated charcoal used, or supported upon any other type of suitable catalyst supports. These catalysts may be used with or without the presence of a volatile halide, such as is used in the processes described in the examples. Activated charcoal alone is a good catalyst for the reaction and when used in conjunction with an inorganic acid, which may be either of a volatile or non-volatile character, particularly so. The following catalysts may likewise be employed: calcium chloride, boron fluoride, cadmium phosphate, silico-tungstic acid, zinc chloride, calcium chloride, calcium iodide, calcium bromide, and potassium fluoride. When employing the volatile halides in conjunction with a solid catalyst, such as activated carbon, impregnated or not with another catalyst, I found that the volatile halides, such, for example, as hydrogen chloride and ammonium chloride, are particularly useful, and, in some instances, the halogens themselves are sufficiently active in conjunction with active carbon to catalyze the reaction. Generally speaking catalysts adapted for the preparation of acids from alcohols and carbon monoxide are suitable for catalyzing the reactions in accord with my invention.

The apparatus, which may be employed for conducting these reactions, may be of any conventional type and preferably one in which the temperature of exothermic reactions can be readily controlled at the desired value. Owing to the corrosive action of the esters produced, the interior of the converter and conduits leading therefrom should preferably be protected. This may be accomplished by using glass or glass-lined apparatus or by coating the inner surfaces of the apparatus with chromium or silver or using for the construction of this equipment acid-resisting alloys of, for example, molybdenum, cobalt, tungsten, chromium, manganese, or nickel.

From a consideration of the above specification it will be realized that any process involving the vapor phase reaction of olefinic hydrocarbons and acyloxy-containing compounds in accord with this invention will come within its scope without sacrificing any of the advantages thereof.

I claim:

1. In an improved vapor phase process of producing higher molecular weight esters from lower molecular weight acids and from lower molecular weight esters, the steps which comprise reacting, at a pressure within the range of 25–900 atmospheres and at a temperature within the range of 200–500° C., a gaseous mixture comprising an olefinic hydrocarbon and a compound containing an acyloxy group, the latter compound being substantially undecomposed at the temperature of the reaction, the reaction being effected in the presence of activated charcoal as a catalyst.

2. In an improved vapor phase process of producing higher molecular weight esters from lower molecular weight acids and from lower molecular weight esters, the steps which comprise reacting, at a pressure within the range of 25–900 atmospheres and at a temperature within the range of 200–500° C., a gaseous mixture comprising an olefinic hydrocarbon and a compound containing an acyloxy group, the latter compound being substantially undecomposed at the temperature of the reaction, the reaction being effected in the presence of an activated carbon catalyst in conjunction with a volatile halide.

3. In an improved vapor phase process for the preparation of higher molecular weight aliphatic alkyl esters from lower molecular weight aliphatic alkyl esters the steps which comprise reacting at a pressure within the range of 25–900 atmospheres and at a temperature within the range 200–500° C., a gaseous mixture comprising an olefinic hydrocarbon and an aliphatic carboxylic acid ester.

4. In a vapor phase process for the preparation of butyl acetate from ethyl acetate the steps which comprise reacting at a pressure within the range of 25-900 atmospheres and at a temperature within the range of 200-500° C. a gaseous mixture containing ethylene and ethyl acetate.

5. In a vapor phase process for the preparation of propyl acetate from acetic acid, the steps which comprise reacting at a pressure within the range of 25-900 atmospheres and at a temperature within the range of 200-500° C., propylene, and acetic acid, the reaction being effected in the presence of activated charcoal in conjunction with a volatile halide.

6. In a vapor phase process for the preparation of propyl acetate from acetic acid, the steps which comprise reacting at a pressure within the range of 25-900 atmospheres and at a temperature within the range of 200-500° C., propylene, and acetic acid, the reaction being effected in the presence of a volatile halide.

7. In an improved vapor phase process for the preparation of higher molecular weight aliphatic alkyl esters the steps which comprise reacting at a pressure within the range of 25-900 atmospheres and at a temperature within the range 200-500° C., a gaseous mixture comprising an olefinic hydrocarbon and an aliphatic carboxylic acid ester, the reaction being effected in the presence of activated charcoal and a volatile halide.

8. In a vapor phase process for the preparation of butyl acetate from ethyl acetate the steps which comprise reacting at a pressure within the range of 25-900 atmospheres and at a temperature within the range of 200-500° C. a gaseous mixture containing ethylene and ethyl acetate, the reaction being effected in the presence of a volatile halide.

9. In a vapor phase process for the preparation of propyl acetate from acetic acid, the steps which comprise reacting at a pressure within the range of 25-900 atmospheres and at a temperature within the range of 200-500° C., propylene, and acetic acid, the reaction being effected in the presence of activated charcoal and a volatile halide.

ALFRED T. LARSON.